(12) United States Patent
Kufeld et al.

(10) Patent No.: US 7,033,545 B2
(45) Date of Patent: Apr. 25, 2006

(54) SLURRY POLYMERIZATION REACTOR HAVING LARGE LENGTH/DIAMETER RATIO

(75) Inventors: Scott E. Kufeld, Houston, TX (US); Thomas A. Reid, Deer Park, TX (US); John H. Tait, Stafford, TX (US); David H. Burns, Houston, TX (US); Donald W. Verser, Houston, TX (US); Harvey D. Hensley, Bartlesville, OK (US); David J. Przelomski, Coopersburg, PA (US); Teddy H. Cymbaluk, Seabrook, TX (US); Robert K. Franklin, Houston, TX (US); Ethelwoldo P. Perez, Sugar Land, TX (US); John D. Hottovy, Bartlesville, OK (US)

(73) Assignee: Chevon Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 10/251,662

(22) Filed: Sep. 20, 2002

(65) Prior Publication Data
US 2003/0229187 A1 Dec. 11, 2003

Related U.S. Application Data

(60) Continuation-in-part of application No. 09/586,370, filed on Jun. 2, 2000, now abandoned, which is a division of application No. 08/893,200, filed on Jul. 15, 1997, now Pat. No. 6,239,235.

(60) Provisional application No. 60/411,208, filed on Sep. 16, 2002.

(51) Int. Cl.
 C08F 2/01 (2006.01)
 B01J 8/08 (2006.01)
 B01J 8/10 (2006.01)

(52) U.S. Cl. .................... 422/135; 422/131; 422/132; 526/64

(58) Field of Classification Search ............... 422/131, 422/132, 135; 526/64, 72
See application file for complete search history.

(56) References Cited

U.S. PATENT DOCUMENTS

| 2,825,721 | A | | 3/1958 | Hogan et al. ............... 260/88.1 |
| 3,324,093 | A | * | 6/1967 | Alleman ....................... 526/64 |
| 4,424,341 | A | | 1/1984 | Hanson et al. .............. 528/501 |
| 4,740,550 | A | * | 4/1988 | Foster .......................... 525/52 |
| 6,204,344 | B1 | | 3/2001 | Kendrick et al. ............. 526/64 |
| 6,239,235 | B1 | | 5/2001 | Hottovy et al. ............... 526/64 |

* cited by examiner

*Primary Examiner*—Alexa D. Neckel

(57) ABSTRACT

A polymerization loop reactor including a loop reaction zone, a continuous takeoff, and a fluid slurry disposed in the reaction zone. A generally cylindrical wall defines the loop reaction zone. The length of the loop reaction zone and the nominal outside diameter of the generally cylindrical wall define a length/diameter ratio greater than 250. The reactor can be charged with a fluid slurry including an olefin monomer reactant, solid olefin polymer particles, and a liquid diluent. The concentration of the solid olefin polymer particles in the slurry can be greater than 40 weight percent based on the weight of polymer particles and the weight of liquid diluent. Also disclosed is a polymerization process carried out by polymerizing, in the loop reaction zone of a reactor as defined above, at least one olefin monomer in a liquid diluent to produce a fluid slurry as defined above.

21 Claims, 5 Drawing Sheets

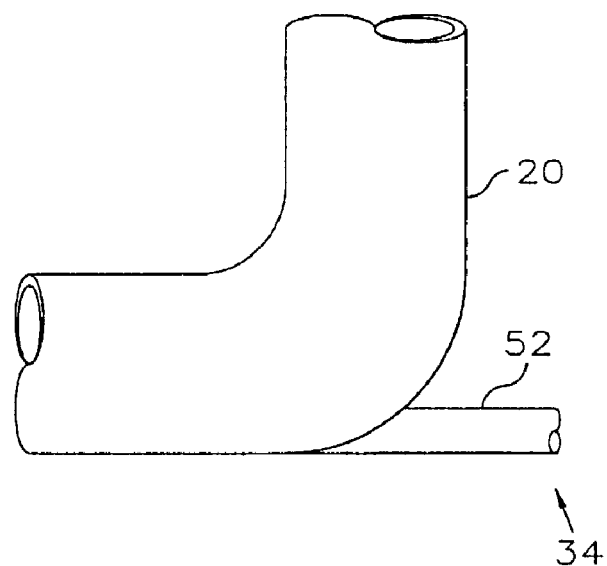
FIG. 4
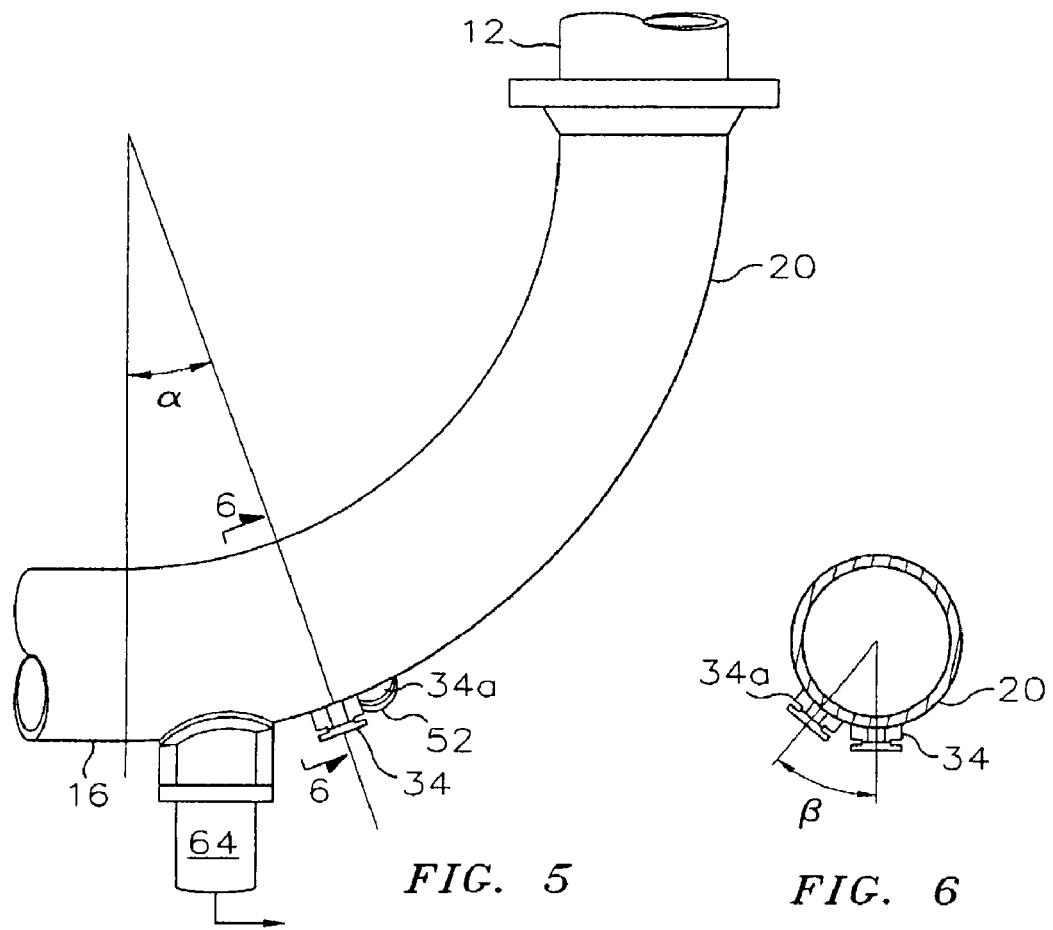
FIG. 5
FIG. 6

US 7,033,545 B2

SLURRY POLYMERIZATION REACTOR HAVING LARGE LENGTH/DIAMETER RATIO

RELATED APPLICATIONS

This application is a continuation-in-part of U.S. Ser. No. 09/586,370, Jun. 2, 2000 now abandoned, which is a divisional of U.S. Ser. No. 08/893,200, Jul. 15, 1997 now U.S. Pat. No. 6,239,235. The specification and claims of each patent and patent application identified in this paragraph are hereby incorporated herein by reference to provide continuity of disclosure. This application also claims the benefit of U.S. Provisional Application Ser. No. 60/411,208, filed Sep. 16, 2002.

FEDERALLY SPONSORED RESEARCH OR DEVELOPMENT

Not Applicable

MICROFICHE/COPYRIGHT REFERENCE

Not applicable

BACKGROUND OF THE INVENTION

This invention relates to the polymerization of olefin monomers in a liquid diluent.

Addition polymerizations are frequently carried out in a liquid that is a solvent for the resulting polymer. When high-density (linear) ethylene polymers first became commercially available in the 1950's this was the method used. It was soon discovered that a more efficient way to produce such polymers was to carry out the polymerization under slurry conditions. More specifically, the polymerization technique of choice became continuous slurry polymerization in a pipe loop reactor with the product being taken off by settling legs that operated on a batch principle to recover product. This technique has enjoyed international success with billions of pounds of ethylene polymers being so produced annually. With this success has come the desirability of building a smaller number of large reactors as opposed to a larger number of small reactors for a given plant capacity.

Settling legs, however, do present two problems. First, they represent the imposition of a "batch" technique onto a basic continuous process. Each time a settling leg reaches the stage where it "dumps" or "fires" accumulated polymer slurry it causes an interference with the flow of slurry in the loop reactor upstream and the recovery system downstream. Also the valve mechanism essential to periodically seal off the settling legs from the reactor upstream and the recovery system downstream requires frequent maintenance due to the difficulty in maintaining a tight seal with the large diameter valves needed for sealing the legs.

Secondly, as reactors have gotten larger, the settling legs present logistic problems. If a pipe diameter is doubled the volume of the reactor goes up four-fold. However, because of the valve mechanisms involved, the size of the settling legs cannot easily be increased further. Hence the number of legs required begins to exceed the physical space available.

In spite of these limitations, settling legs have continued to be employed where olefin polymers are formed as a slurry in a liquid diluent. This is because, unlike bulk slurry polymerizations (i.e. where the monomer is the diluent) where solids concentrations of better than 60 percent are routinely obtained, olefin polymer slurries in a diluent are generally limited to no more than 37 to 40 weight percent solids. Hence settling legs have been believed to be necessary to give a final slurry product at the exit to the settling legs of greater than 37–40 percent. This is because, as the name implies, settling occurs in the legs to thus increase the solids concentration of the slurry finally recovered as product slurry.

Another factor affecting maximum practical reactor solids is circulation velocity, with a higher velocity for a given reactor diameter allowing for higher solids since a limiting factor in the operation is reactor fouling due to polymer build up in the reactor.

Two pertinent patents addressing loop reactors for slurry polymerization are U.S. Pat. Nos. 6,239,235 and 6,204,344, each of which is incorporated here by reference in its entirety for its description of loop reactors and their diameters, lengths, equipment, and operation.

SUMMARY OF THE INVENTION

One aspect of the invention is a charged polymerization loop reactor including a loop reaction zone, a continuous takeoff, and a fluid slurry disposed in the reaction zone. A generally cylindrical wall defines the loop reaction zone. The length of the loop reaction zone and the nominal outside diameter of the generally cylindrical wall define a length/diameter ratio greater than 250. The fluid slurry includes at least one olefin monomer reactant, solid olefin polymer particles, and a liquid diluent. The concentration of the solid olefin polymer particles in the slurry is greater than 40 weight percent based on the weight of polymer particles and the weight of liquid diluent. The continuous take off is provided for continuously withdrawing the fluid slurry from the loop reaction zone.

Another aspect of the invention is a polymerization loop reactor including a loop reaction zone and a continuous takeoff. A generally cylindrical wall defines the loop reaction zone. The length of the loop reaction zone and the nominal outside diameter of the generally cylindrical wall define a length/diameter ratio greater than 1000. The continuous take off is provided for continuously withdrawing a fluid slurry from the loop reaction zone.

Yet another aspect of the invention is a polymerization process carried out by polymerizing, in the loop reaction zone of a reactor as defined above, at least one olefin monomer in a liquid diluent to produce a fluid slurry comprising the liquid diluent and solid olefin polymer particles. During the process the concentration of solid olefin polymer particles in the slurry is maintained at greater than 40 weight percent based on the weight of polymer particles and the weight of liquid diluent. The solid olefin polymer product is removed from the reaction zone by continuously withdrawing the slurry from the reaction zone.

BRIEF DESCRIPTION OF DRAWINGS

In the drawings, forming a part hereof,

FIG. 4 is a cross section of a tangential location for the continuous take off assembly;

FIG. 5 is a side view of an elbow of the loop reactor showing both a settling leg and continuous take off assemblies;

FIG. 6 is a cross section across line 6—6 of FIG. 5 showing the orientation of two of the continuous take off assemblies;

DETAILED DESCRIPTION OF THE INVENTION

Figure 1:
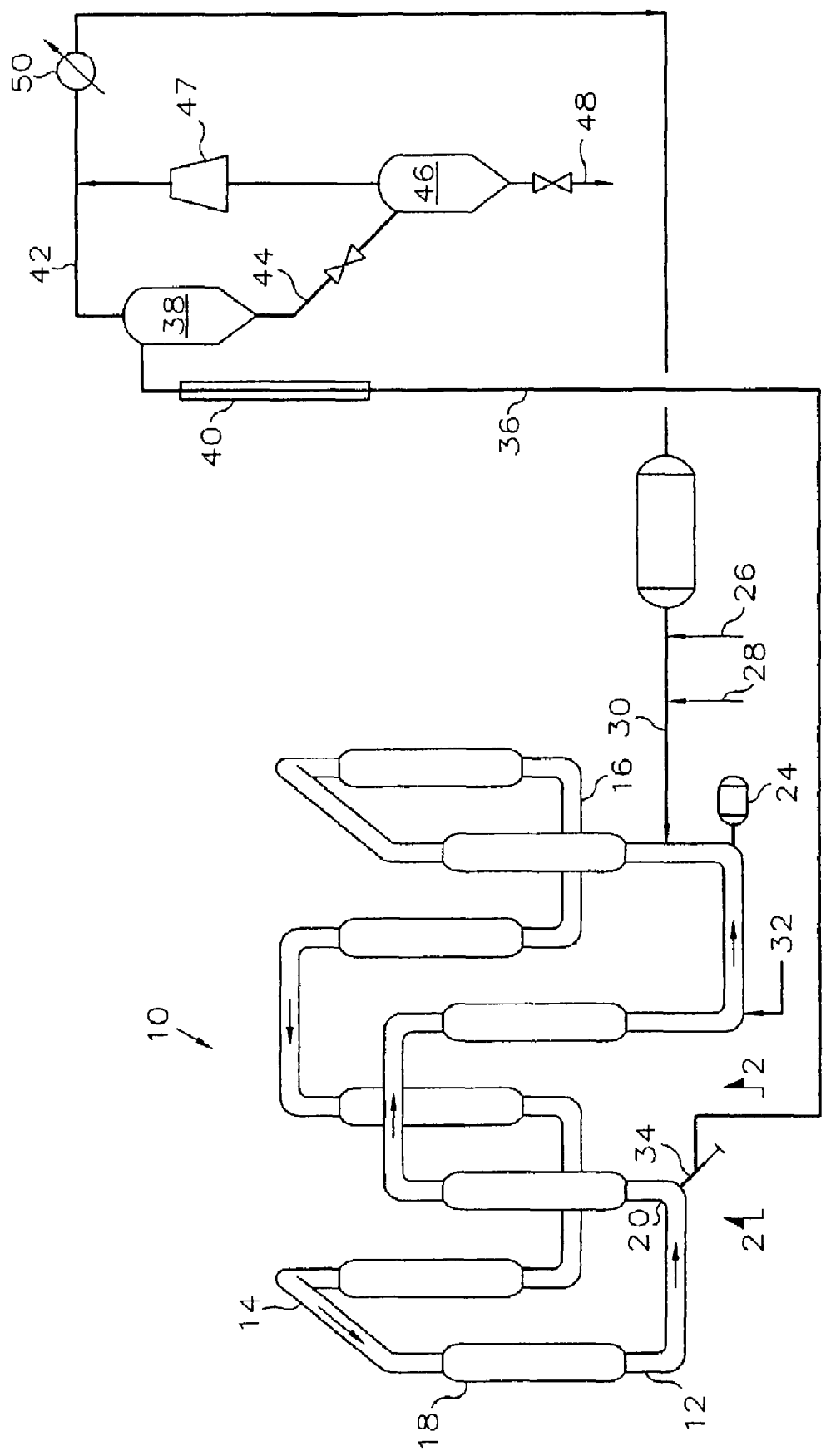
FIG. 1 is a schematic perspective view of a loop reactor and polymer recovery system.

Surprisingly, it has been found that continuous take off of product slurry in an olefin polymerization reaction carried out in a loop reactor in the presence of an inert diluent allows operation of the reactor at a much higher solids concentration. Commercial production of predominantly ethylene polymers in isobutane diluent has generally been limited to a maximum solids concentration in the reactor of 37–40 weight percent. However, the continuous take off has been found to allow significant increases in solids concentration. Furthermore, the continuous take off itself brings about some additional increase in solids content as compared with the content in the reactor from which it takes off product because of the placement of the continuous take off appendage, which selectively removes a slurry from a stratum where the solids are more concentrated. Hence concentrations of greater than 40 weight percent are possible in accordance with this invention.

Throughout this application, the weight of catalyst is disregarded since the productivity, particularly with chromium oxide on silica, is extremely high.

Also surprisingly, it has been found that more aggressive circulation (with its attendant higher solids concentration) can be employed. Indeed, by employing more aggressive circulation in combination with continuous take off of the slurry, solids concentrations of greater than 50 weight percent can be removed from the reactor by the continuous take off. For instance, the continuous take off can easily allow operating at 5–6 percentage points higher; i.e., the reactor can be adjusted to easily raise solids by 10 percent; and the more aggressive circulation can easily add another 7–9 percentage points which puts the reactor above 50 percent. But, because the continuous take off is positioned to take off slurry from a stratum in the stream which has a higher than average concentration of solids, the product actually recovered has about 3 percentage points (or greater) higher concentration than the reactor slurry average. Thus the operation can approach an effective slurry concentration of 55 weight percent or more, i.e. 52 percent average in the reactor and the removal of a component that is actually 55 percent (i.e. 3 percentage points) higher.

It must be emphasized that in a commercial operation as little as a one-percentage point increase in solids concentration is of major significance. Therefore going from 37–40 average percent solids concentration in the reactor to even 41 is important; thus going to greater than 50 is truly remarkable.

The present invention is applicable to any olefin polymerization in a loop reactor utilizing a diluent so as to produce a product slurry of polymer and diluent. Suitable olefin monomers are 1-olefins having up to 8 carbon atoms per molecule and no branching nearer the double bond than the 4-position. The invention is particularly suitable for the homopolymerization of ethylene and the copolymerization of ethylene and a higher 1-olefin such as butene, 1-pentene, 1-hexene, 1-octene or 1-decene. Especially preferred is ethylene and 0.01 to 10, preferably 0.01 to 5, most preferably 0.1 to 4 weight percent higher olefin based on the total weight of ethylene and comonomer. Alternatively sufficient comonomer can be used to give the above-described amounts of comonomer incorporation in the polymer.

Suitable diluents (as opposed to solvents or monomers) are well known in the art and include hydrocarbons that are inert and liquid under reaction conditions. Suitable hydrocarbons include isobutane, propane, n-pentane, i-pentane, neopentane and n-hexane, with isobutane being especially preferred.

Suitable catalysts are well known in the art. Particularly suitable is chromium oxide on a support such as silica as broadly disclosed, for instance, in Hogan and Banks, U.S. Pat. No. 2,285,721 (March 1958), the disclosure of which is hereby incorporated by reference.

Referring now to the drawings, there is shown in FIG. 1 a loop reactor 10 having vertical segments 12, upper horizontal segments 14 and lower horizontal segments 16 of reactor piping, some or all of which have generally cylindrical walls, joined end to end by junctions such as elbows to form a complete circuit or loop, sometimes referred to as a loop reaction zone, of a certain length. These upper and lower horizontal segments define upper and lower zones of horizontal flow. In this embodiment, each bend or elbow 20 is smooth, thus providing a continuous flow path substantially free from internal obstructions.

The reactor piping can have any suitable inside diameter and any suitable outside diameter providing a pipe wall that is thick enough to withstand the reactor pressure and allow the reactor to be supported, and thin enough to transfer heat efficiently. For example, piping having a 20-inch (0.51 m), 22-inch (0.56 m), 24-inch (0.61 m), 26-inch (0.66 m), 28-inch (0.71 m), or greater nominal outside diameter, or any diameter between those values, is contemplated. Such piping can have the inside and outside diameters shown in Table 1, where the outside diameter is nominal and the inside diameter is calculated to accept the pressure contemplated in one embodiment of the invention.

The reactor is cooled by two-pipe heat exchangers formed by the pipes 12 and jackets 18. More heat exchangers can be provided, if desired or useful, in the horizontal segments of the reactor.

Figure 8:
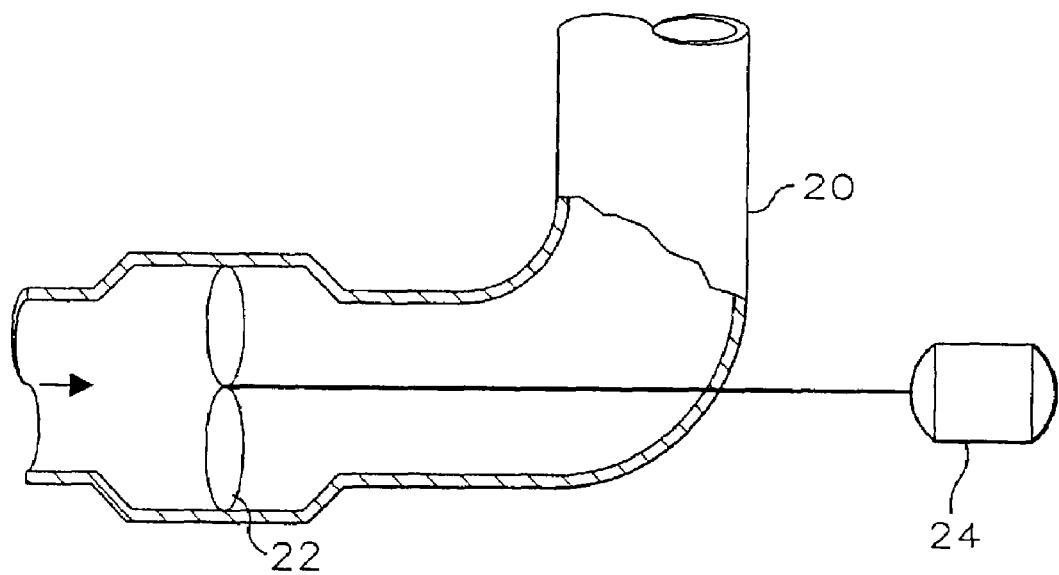
FIG. 8 is a cross sectional view of the impeller mechanism.

The reaction slurry is circulated by an impeller 22 (shown in FIG. 8) driven by a motor 24. As shown in FIG. 8, the impeller 22 and the casing or reactor wall surrounding the impeller can be greater in diameter than the general diameter of the piping forming the reactor. This feature is particularly desirable where the loop reactor has a high length/outside diameter ratio, creating greater resistance to flow around the loop than would be found in a loop having a lower ratio.

Since the volumetric flow of material is essentially identical through each cross-section of the reactor, the use of a larger-diameter impeller 22 and a larger impeller motor 24 than usual for the general size of pipe in the loop increases the velocity of flow through the normal-diameter piping. An increased velocity is desirable to avoid the need for additional time for the components of the slurry to travel around the loop in a reactor having a high Length/Outside Diameter ratio.

The velocity of the slurry should also be maintained high enough to avoid saltation or deposition of solids from the slurry. The saltation velocity of a slurry is defined as the minimum flow velocity needed to avoid saltation, and varies with process conditions. For example, the larger the reactor diameter, the greater the saltation velocity. Also, the larger the proportion of solids in the slurry, the higher the saltation velocity. Since high solids are desirable, one way to maintain flow above the saltation velocity at a high solids content is to use a relatively small-diameter reactor.

It will also be appreciated that the reactor loop may have more than one impeller or more than one impeller/motor combination in series around the loop. The series impellers may be close together, distributed about the loop, or otherwise arranged in any appropriate manner. It is contemplated that existing pump technology can support a reactor of roughly 44,000 or 45,000 gallons (166 or 170 m$^3$), depending on its diameter and configuration. This assumes a circulation velocity of 32 ft/s (9.75 m/s) is maintained.

Referring to the Figures, the reacting monomer, comonomer, if any, and make up diluent are introduced via lines 26 and 28 respectively which can enter the reactor directly at one or a plurality of locations or can combine with the condensed diluent recycle line 30 as shown. The catalyst is introduced via a catalyst introduction port 32, which provides a zone (location) for catalyst introduction. The elongated hollow appendage for continuously taking off an intermediate product slurry is designated broadly by the reference character 34. The continuous take off mechanism 34 is located in or adjacent to a downstream end of one of the lower horizontal reactor loop sections 16 and adjacent or on a connecting elbow 20. While continuous take off is generally preferred, the reactor could also be used with settling legs or intermittent take off, in whole or in part, without departing from certain aspects of the invention.

The continuous take off appendage is shown at the downstream end of a lower horizontal segment of the loop reactor, which is the preferred location. The location can be in an area near the last point in the loop where flow turns upward before the catalyst introduction point so as to allow fresh catalyst the maximum possible time in the reactor before it first passes a take off point. However, the continuous take off appendage can be located on any segment or any elbow.

Also, the segment of the reactor to which the continuous take off appendage is attached can be of larger diameter to slow down the flow and hence allow stratification or saltation of the flow so that the product coming off can have an even greater concentration of solids.

The continuously withdrawn intermediate product slurry is passed via a conduit 36 into a high-pressure flash chamber 38. The conduit 36 includes a surrounding conduit 40, which is provided with a heated fluid to indirectly heat the slurry in the flash line conduit 36. The vaporized diluent exits the flash chamber 38 via a conduit 42 for further processing which includes condensation by simple heat exchange using a recycle condenser 50, and return to the system, without the necessity for compression, via a recycle diluent line 30.

The recycle condenser 50 can utilize any suitable heat exchange fluid known in the art under any conditions known in the art. However preferably a fluid at a temperature that can be economically provided is used. A suitable temperature range for this fluid is 40 degrees F. to 130 degrees F. (4° C. to 54° C.). Polymer particles are withdrawn from the high-pressure flash chamber 38 via the line 44 for further processing using techniques known in the art. Preferably they are passed to the low-pressure flash chamber 46 and then are recovered as the polymer product via the line 48. The separated diluent passes through the compressor 47 to a line 42. This high-pressure flash design is broadly disclosed in Hanson and Sherk, U.S. Pat. No. 4,424,341 (Jan. 3, 1984), the disclosure of which is incorporated by reference.

Surprisingly, it has been found that the continuous take off not only allows for higher solids concentration upstream in the reactor, but also allows better operation of the high pressure flash, thus allowing the majority of the withdrawn diluent to be flashed off and recycled with no compression. Indeed, 70 to 90 percent of the diluent can generally be recovered in this manner. This result is understood to occur for several reasons. First, because the flow is continuous instead of intermittent, the flash line heaters work better. Also, the pressure drop after the proportional control valve that regulates the rate of continuous flow out of the reactor is smaller, which means when the slurry flashes it drops the temperature lower, thus allowing more efficient use of the flash line heaters.

Figure 2:
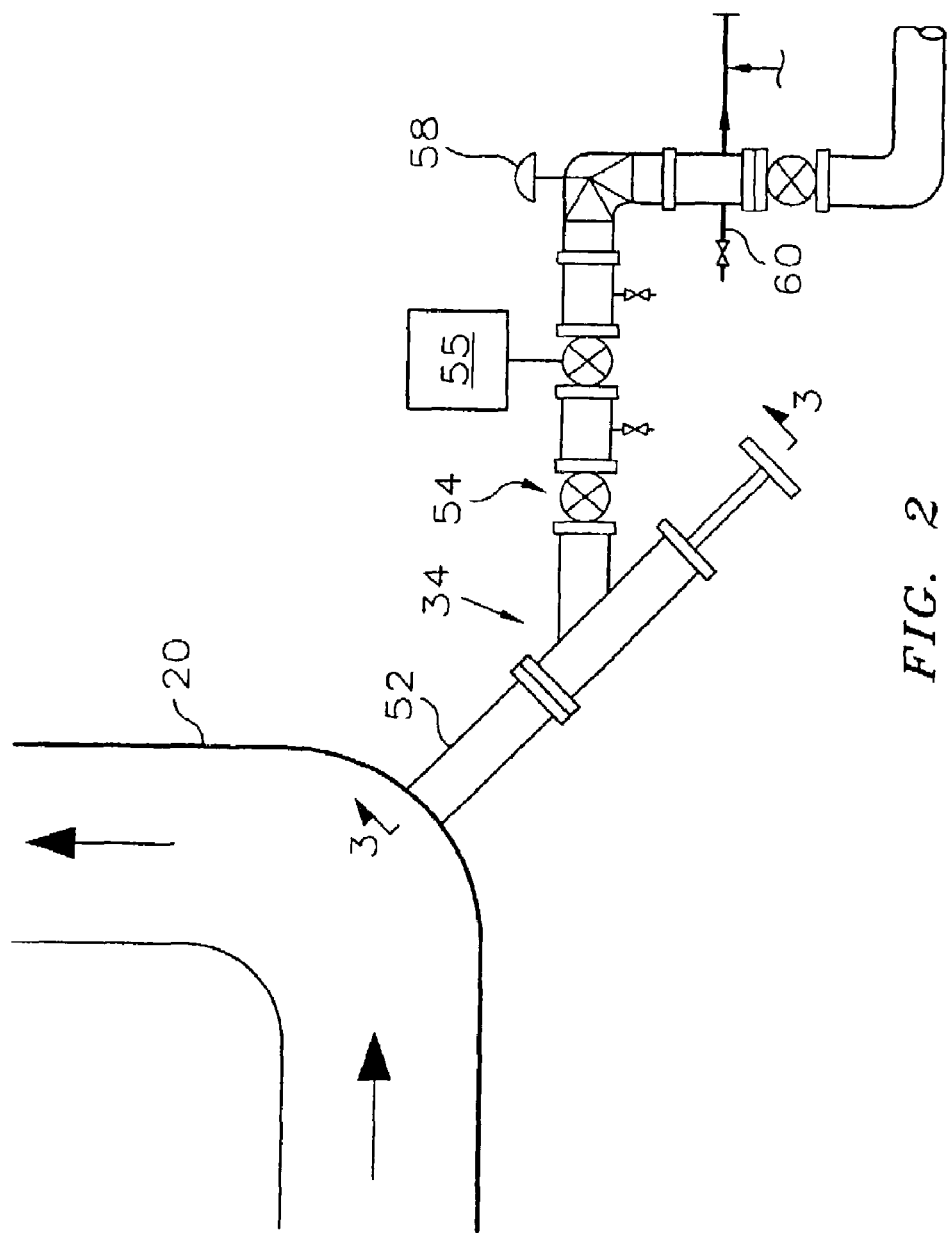
FIG. 2 is cross section along line 2—2 of FIG. 1 showing a continuous take off appendage.

FIG. 2 shows the elbow 20 with its continuous take off mechanism 34 in greater detail. The continuous take off mechanism comprises a take off cylinder 52, a slurry withdrawal line 54, an emergency shut off valve 55, a proportional motor valve 58 to regulate flow, and a flush line 60. The reactor is run "liquid" full. Because the dissolved monomer is present, the liquid is slightly compressible, thus allowing pressure control of the liquid full system with a valve. The diluent input is generally held constant, and the proportional motor valve 58 is used to control the rate of continuous withdrawal to maintain the total reactor pressure within designated set points.

Figure 3:
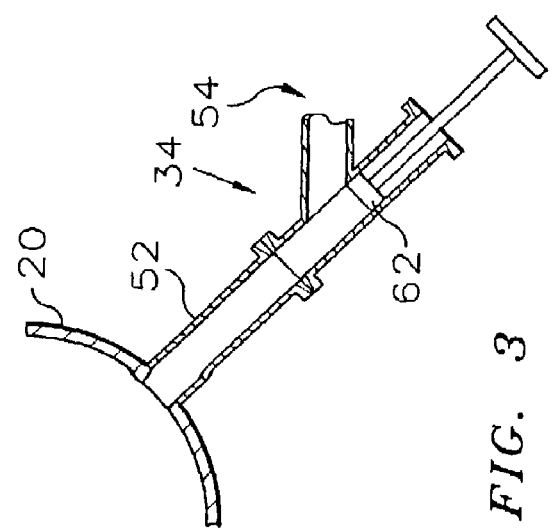
FIG. 3 is a cross section along line 3—3 of FIG. 2 showing a ram valve arrangement in the continuous take off assembly.

FIG. 3, which is taken along section line 3—3 of FIG. 2, shows the continuous take off mechanism 34 in greater detail. The elbow 20 is an appendage-carrying elbow. As shown, the mechanism comprises a take off cylinder 52 attached, in this instance, at a right angle to a tangent to the outer surface of the elbow. A slurry withdrawal line 54 comes off the cylinder 52. Disposed within the take off cylinder 52 is a ram valve 62, which serves two purposes. First it provides a simple and reliable clean-out mechanism for the take off cylinder, if it should ever become fouled with polymer. Second, it can serve as a simple and reliable shut-off valve for the entire continuous take off assembly.

FIG. 4 shows a preferred attachment orientation for the take off cylinder 52, which extends along a line tangential to the curvature of the elbow 20 at a point just prior to the slurry flow turning upward. This opening is elliptical to the inside surface. The opening could be enlarged more to improve solids take off.

FIG. 5 shows four things. First, it shows an angled orientation of the take off cylinder 52. The take off cylinder is shown at an angle, alpha, to a plane that is (1) perpendicular to the centerline of the horizontal segment 16 and (2) located at the downstream end of the horizontal segment 16. The angle with this plane is taken in the downstream direction from the plane. The apex for the angle is the center point of the elbow radius as shown in FIG. 5. The plane can be described as the horizontal segment cross sectional plane. Here the angle depicted is about 24 degrees. Second, it shows a plurality of continuous take off appendages, 34 and 34a. Third, it shows one appendage, 34 oriented on a vertical center line plane of lower segment 16, and the other, 34a, located at an angle to such a plane as will be shown in more detail in FIG. 6. Finally, it shows the combination of continuous take off appendages 34 and a conventional settling leg 64 for batch removal, if desired.

In another embodiment of this invention, a polymerization process is provided. The process comprises: 1) polymerizing, in a loop reaction zone, at least one olefin monomer in a liquid diluent to produce a fluid slurry, wherein the fluid slurry comprises the liquid diluent and solid olefin polymer particles; 2) withdrawing the fluid slurry by alternately carrying out the following steps: a) allowing the fluid slurry to settle into at least one settling zone and thereafter withdrawing a batch of the thus settled slurry from the settling zone as an intermediate product of the process, thereafter shutting off the settling zone; and b) thereafter continuously withdrawing the fluid slurry comprising withdrawn liquid diluent and withdrawn solid polymer particles as an intermediate product of the process. In step b), the reactor conditions can be adjusted during startup to raise reactor solids by at least 10%.

As can be seen from the relative sizes, the continuous take off cylinders are much smaller than the conventional settling legs. Yet three 2-inch (5-cm) ID continuous take off appendages can remove as much product slurry as fourteen 8-inch (20-cm) ID settling legs. This is significant because with current large commercial loop reactors of 15,000–18,000 gallon (57–68 $m^3$) capacity, six 8-inch (20-cm) settling legs are required. It is not desirable to increase the size of the settling legs because of the difficulty of making reliable valves for larger diameters. As noted previously, doubling the diameter of the pipe increases the volume four-fold and there simply is not enough room for four times as many settling legs to be easily positioned. Hence, the invention makes feasible the operation of larger, more efficient reactors. Reactors of 30,000 gallons (114 $m^3$) or greater are made possible by this invention. Generally the continuous take off cylinders will have a nominal internal diameter within the range of 1 inch (2.5 cm) to less than 8 inches (20 cm). Preferably they will be about 2–3 inches (5–7.5 cm) internal diameter.

FIG. 6 is taken along section line 6—6 of FIG. 5 and shows the take off cylinder 34a attached at a place that is oriented at an angle, beta, to a vertical plane containing the centerline of the reactor. This plane can be referred to as the vertical center plane of the reactor. This angle can be taken from either side of the plane or from both sides if it is not zero. The apex of the angle is located at the reactor centerline. The angle is contained in a plane perpendicular to the reactor centerline as shown in FIG. 6.

There are three orientation concepts respecting the relation of the take off cylinder 34a to the reactor piping. First is the attachment orientation, i.e. tangential as in FIG. 4 and perpendicular as in FIGS. 2 or 7 or any angle between these two limits of 0 and 90 degrees. Second is how far up the curve of the elbow the attachment is positioned, as represented by angle alpha (FIG. 5). Angle alpha can be from 0 to 60 degrees but is preferably from 0 to 40 degrees, more preferably from 0 to 20 degrees. Third is the angle, beta, from the center plane of the longitudinal segment (FIG. 6). This angle can be from 0 to 60 degrees, preferably 0 to 45 degrees, more preferably 0–20 degrees.

Figure 7:
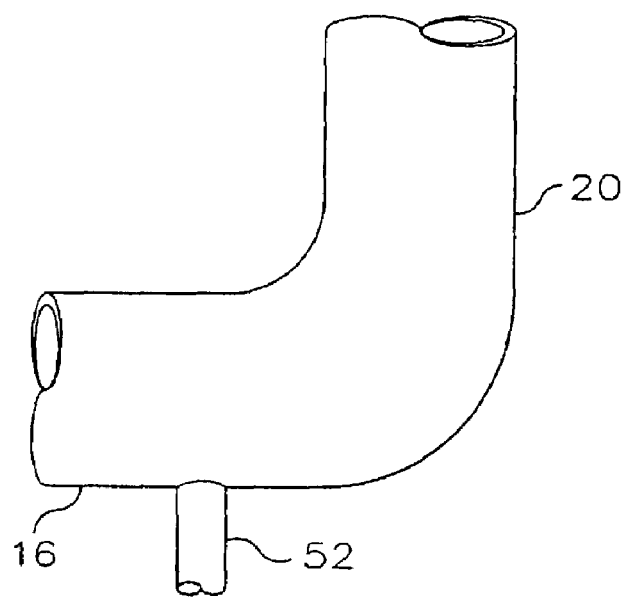
FIG. 7 is a side view showing another orientation for the continuous take off assembly.

FIG. 7 shows an embodiment where the continuous take off cylinder 52 has an attachment orientation of perpendicular, an alpha orientation of 0 (inherent since it is at the end of, but still on, the straight section), and a beta orientation of 0, i.e. it is right on the vertical centerline plane of the lower horizontal segment 16.

FIG. 8 shows in detail the impeller 22 for moving the slurry along its flow path. As can be seen in this embodiment, the impeller 22 is in a slightly enlarged housing or casing (relative to the rest of the reactor wall), which serves as the propulsion zone for the circulating reactants. Preferably the system is operated at a pressure differential of at least 18 psig (12 $N/cm^2$) preferably at least 20 psig (14 $N/cm^2$), more preferably at least 22 psig (15 $N/cm^2$) between the upstream and downstream ends of the propulsion zone in a nominal two foot (0.61 m) diameter reactor with a total flow path length of about 950 feet (290 m) using isobutane to make predominantly ethylene polymers. As much as 50 psig (34 $N/cm^2$) or more is possible. This can be done by controlling the speed of rotation of the impeller, reducing the clearance between the impeller and the inside wall of the pump housing or by using a more aggressive impeller design as is known in the art. This higher pressure differential can also be produced by the use of at least one additional pump.

Generally the system is operated so as to generate a pressure differential, expressed as a loss of pressure per unit length of reactor, of at least 0.07, generally 0.07 to 0.15 foot slurry height pressure drop per foot of reactor length (i.e. a 0.07 m to 0.15 m slurry height pressure drop per meter of reactor length) for a nominal 24 inch (0.61 m) diameter reactor. Preferably, this pressure drop per unit length is 0.09 to 0.11 units for a 24-inch (0.61 m) diameter reactor. For larger diameters, a higher slurry velocity and a higher pressure drop per unit length of reactor is needed. This assumes the density of the slurry which generally is about 0.5–0.6 $g/cm^3$.

Figure 9:
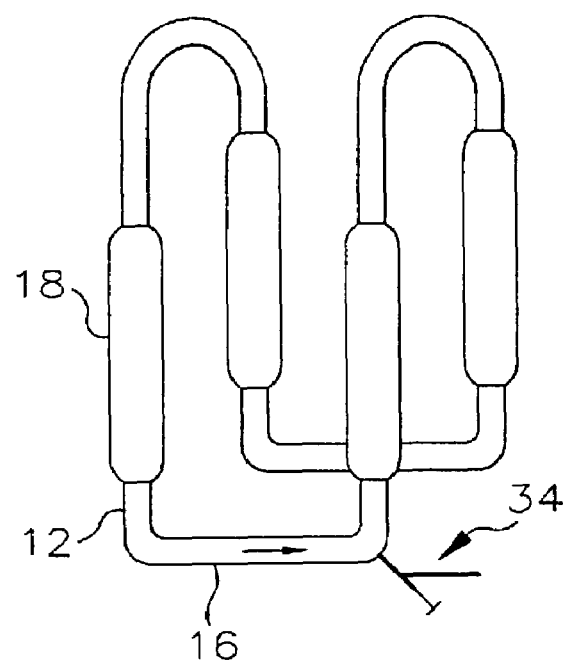
FIG. 9 is a schematic view showing another configuration for the loops wherein the upper segments 14a are 180 degree half circles and wherein the vertical segments are at least twice as long as the horizontal segments and FIG. 10 is a schematic view showing the longer axis disposed horizontally.
Figure 10:
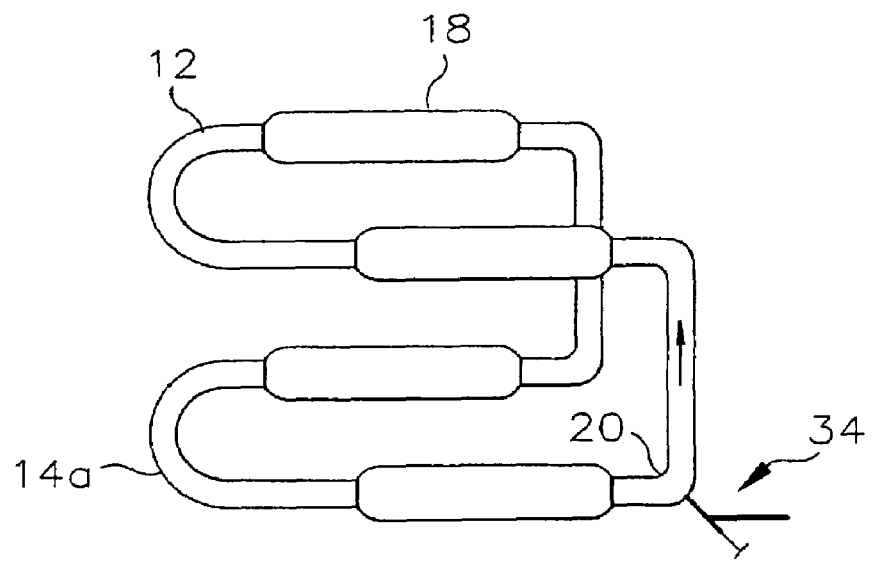

Referring now to FIG. 9, the upper segments are shown as 180-degree half circles, which is the preferred configuration. The vertical segments are at least twice the length, generally about seven to eight times the length, of the horizontal segments. For instance, the vertical flow path can be 190–225 feet (60–69 m) and the horizontal segments can be 25–30 feet (7.6–9.1 m) in flow path length. Any number of loops can be employed in addition to the four depicted here and the eight depicted in FIG. 1, but generally four or six are used. A reference to a nominal two-foot (0.61 m) diameter means an internal diameter of about 21.9 inches (0.556 m). The flow length of the reactor is generally greater than 500 feet (152 m), generally greater than 900 feet (274 ), with about 940 to 1,350 feet (286–411 m) being quite satisfactory.

Commercial pumps for utilities such as circulating the reactants in a closed loop reactor are routinely tested by their manufacturers and the necessary pressures to avoid cavitation are easily and routinely determined.

EXAMPLE 1

One example of the invention is a process employing a low-density metallocene resin which is heat transfer limited. The reactor temperature is 175° F. (79° C.) and the minimum coolant temperature at the reactor inlet is 115° F. (46° C.). The catalyst production is adequate to maintain the desired high production rate and low ash level, and other conditions are controlled so the rate of heat transfer is the limiting factor on production. The dimensions of the respective reactors of different nominal diameters are as given above.

In this process, as shown in Table 2, the surface area per unit reactor volume and the production rate (% of non-heat-limited production) increase with decreasing reactor diameter, compared to the production rate of a resin that is not heat transfer limited.

The effect of per cent solids in the reactor on the saltation velocity for a given reactor diameter is shown by Table 3, which provides the minimum circulation velocity to avoid saltation increases with the reactor diameter.

EXAMPLE 2

A four-vertical-leg polymerization reactor using a 26-inch (0.66 m) Lawrence Pumps Inc. pump impeller D51795/81-281 in a M51879/FAB casing was used to polymerize ethylene and hexene-1. This pump was compared with a 24-inch (0.61-m) pump that gave less aggressive circulation (0.66 ft/ft or m/m of pressure drop vs. 0.98 ft/ft or m/m). This was then compared with the same more aggressive circulation and a continuous take off assembly of the type shown by reference character 34 of FIG. 5. The results are shown in Table 4.

EXAMPLE 3

Representative loop reactor length/reactor outside diameter ratios are calculated in Table 5 for the various loop reactors described in U.S. Pat. Nos. 6,239,235 and 6,204,344. In Table 5, the "Row" column is added for easy reference to a particular row of data. The "Reference" column indicates which patent discloses the reactor in question (the '235 patent or the '344 patent), and at what column and line of the patent the disclosure is found. (for example, the first entry indicates a description in the '235 patent, col. 7, lines 12–14). "OD" indicates the nominal or outside diameter of the reactor pipe (this should not be confused with the diameter of the loop, which would be much greater), "ID" indicates the inside diameter of the reactor pipe. "Length" is the length of the reactor (i.e. one circuit of the reactor loop). "Vol." is the volume of the reactor. "L/OD ratio" is the ratio of the reactor length to the pipe diameter, expressed in the same units so the ratio is unitless.

In the entries for the '235 patent (Rows 1–6 and 8–10), the OD of the pipe and in some cases the reactor length are given in the '235 patent at col. 7, lines 12–14. For other cases the reactor length for the '235 patent was calculated from the reactor volume, in particular with reference to reactors having a volume of greater than 20,000 gal. (76 m$^3$) (see col. 8, claim 9) or greater than 30,000 gal. (114 m$^3$) (see col. 2, line 9 or col. 8, claim 10). In those instances, a 24-inch (0.61 m) OD reactor pipe having a 21.9-inch (0.5562 m) ID was used to calculate the length of pipe necessary to have a reactor volume of the stated number of gallons.

In the entries for the '344 patent (Rows 7 and 11), the OD of the pipe is disclosed by the patent to be 20 inches (0.51 m) and the length (833 ft, 254 m) and volume (11,500 gal., 44 m$^3$) of one reactor can be used to calculate the reactor ID (18.4 in., 0.47 m). That reactor ID was then used to calculate the length of the 20,000 gal. (76 m$^3$) reactor recited in the '344 patent.

The calculations in Table 5 show that the disclosed Length/Outside Diameter ratios vary between 250 (which is actually disclosed to be greater than 250, since it is calculated for a reactor length given in the reference as greater than 500 feet (152 m), and an OD of 2 feet (0.61 m) and 869 (based on a 20,000 gal. (76 m$^3$) reactor having an ID of 20 inches (0.51 m).

The inventors contemplate reactors having Length/Outside Diameter ratios equal to or greater than about or exactly 250, 300, 350, 383, 400, 450, 460, 470, 475, 500, 511, 600, 675, 700, 767, 800, 869, 900, 1,000, 1,100, 1,200, 1,300, 1,370, 1,400, 1,500, where "about" allows a variation of plus or minus one of the last significant figure stated in the number. Thus, "about 700" allows a range of 600 to 800, while "about 767" allows a range of 766 to 768. The inventors further contemplate ranges of Length/Diameter ratios having as a minimum any of the previously stated values and as a maximum any greater one of the previously stated values. A few non-limiting examples of such closed-ended ranges are 250–1500, 511–1370, and 1,000–1,100.

Speaking more generally, the inventors contemplate that the Length/Outside Diameter ratio of a loop reactor should be increased to a greater value than the corresponding ratios of preexisting reactors, to provide a more favorable ratio of reactor volume to heat transfer area, for more efficient cooling. If the ratio is increased by using relatively small diameter piping for the loop, a double advantage to heat transfer is gained. First, the area of the piping in relation to its volume increases. Second, the wall thickness of the piping can be reduced, as smaller-diameter piping is stronger per unit surface area and the saltation velocity of the slurry is lower, so the pressure head can be reduced. Both factors increase heat transfer across the pipe wall.

Another advantage of increasing the Length/Outside Diameter (L/OD) ratio of a reactor is that it improves the versatility of the reactor. For example, the production rate of a low-density resin, one example of which is low-density polyethylene, may be limited in relatively low L/OD ratio equipment by the relatively low rate of heat transfer in such equipment. All other things being equal, this problem might be addressed by increasing the length of the reactor. The production rate of a high-density resin in the same equipment may be limited by the need to remove the polymer after a relatively short residence time in the reactor to avoid ash formation, which relates to the length of the loop, both overall and between the point of addition of monomer reactants and the point of removal of polymer products. All other things being equal, this problem might be addressed by reducing the length of the reactor. Since a single conventional reactor can only have one length, if the reactor were optimized for one type of resin, it would be less efficient when used to make other resins.

Using the present invention, the heat transfer limited resin can be processed efficiently by increasing the surface area of the reactor per unit volume, thus increasing heat transfer, without reducing its overall capacity. The residence time limited resin can be processed more efficiently in the same equipment by pumping the slurry at the same volumetric rate. Thus, both types of resins can be processed efficiently in the same reactor, or at least a greater range of resins can be processed efficiently in the same reactor.

TABLE 1

Reactor Piping Dimensions
(English Units)

| Reactor OD, in. | Reactor ID, in. | Thickness, in. |
| --- | --- | --- |
| 20 | 18.82 | 0.592 |
| 22 | 20.72 | 0.639 |
| 24 | 22.62 | 0.689 |
| 26 | 24.53 | 0.735 |

TABLE 1A

Reactor Piping Dimensions
(Metric Units)

| Reactor OD, m | Reactor ID, m | Thickness, mm |
| --- | --- | --- |
| 0.51 | 0.48 | 15 |
| 0.56 | 0.53 | 16 |

TABLE 1A-continued

Reactor Piping Dimensions
(Metric Units)

| Reactor OD, m | Reactor ID, m | Thickness, mm |
|---|---|---|
| 0.61 | 0.57 | 17.5 |
| 0.66 | 0.62 | 19 |

TABLE 2

Production vs. Reactor Diameter
(English Units)

| Reactor Diameter (OD), In. | Surface Area/Vol. (ft²/ft³) | % of non-heat-limited production | Pump Type | Pump Capacity (gpm) (10³) | Min. Flow Velocity (ft/s) |
|---|---|---|---|---|---|
| 20 | 2.71 | 99 | A | 26 | 29.0 |
|  |  |  | B | 27 | 30.2 |
| 22 | 2.46 | 87 | A | 34 | 31.5 |
|  |  |  | B | 36 | 33.3 |
| 24 | 2.25 | 75 | A | 40 | 31.6 |
|  |  |  | B | 44 | 34.3 |
| 26 | 2.07 | 64 | A | 44 | 29.8 |
|  |  |  | B | 50 | 33.2 |

TABLE 2A

Production vs. Reactor Diameter
(Metric Units)

| Reactor Diameter (OD), m | Surface Area/Vol. (m²/m³) | % of non-heat-limited production | Pump Type | Pump Capacity (lit./min) (10³) | Min. Flow Velocity (m/sec) |
|---|---|---|---|---|---|
| 0.51 | 2.71 | 99 | A | 98 | 8.8 |
|  |  |  | B | 102 | 9.2 |
| 0.56 | 2.46 | 87 | A | 129 | 9.6 |
|  |  |  | B | 136 | 10.1 |
| 0.61 | 2.25 | 75 | A | 151 | 9.63 |
|  |  |  | B | 167 | 10.5 |
| 0.66 | 2.07 | 64 | A | 167 | 9.1 |
|  |  |  | B | 189 | 10.1 |

TABLE 3A

Reactor Diameter vs. Saltation Velocity
(English Units)

| Reactor Outside Diameter (in.) | Reactor Solids, % | Min. Circulation Velocity (f/s) to Avoid Saltation |
|---|---|---|
| 24 | 36 | 22.5 |
| 24 | 40 | 24.0 |
| 24 | 44 | 26.1 |
| 24 | 48 | 28.6 |
| 24 | 52 | 32.8 |

TABLE 3B

Reactor Diameter vs. Saltation Velocity
(Metric Units)

| Reactor Outside Diameter (m.) | Reactor Solids, % | Min. Circulation Velocity (m/s) to Avoid Saltation |
|---|---|---|
| 0.61 | 36 | 6.9 |
| 0.61 | 40 | 7.3 |
| 0.61 | 44 | 8.0 |
| 0.61 | 48 | 8.7 |
| 0.61 | 52 | 10.0 |

TABLE 4

(English Units)

| Description | 24 in Pump | 26 in Pump | 26 in Pump + CTO |
|---|---|---|---|
| Avg. Reactor Solids Concentration, wt. % | 39 | 45 | 53 |
| Polymer Production Rate, mlbs/hr | 40.1 | 40.7 | 39.9 |
| Reactor Circulation Pump Power, kw | 430 | 691 | 753 |
| Circulation Pump Pressure Diff, psi | 14.3 | 22.4 | 23.7 |
| Circulation Pump Head, ft | 61.8 | 92.5 | 92.4 |
| Reactor Slurry Flow Rate, mGPM | 39 | 46 | 45 |
| Reactor Slurry Density, gm/cc | 0.534 | 0.558 | 0.592 |
| Reactor Temperature, F. | 215.6 | 218.3 | 217.0 |
| Ethylene Concentration, wt % | 4.43 | 3.67 | 4.9 |
| Hexene-1 Concentration, wt % | 0.22 | 0.17 | 0.14 |
| Reactor Heat Transfer Coefficient | 270 | 262 | 241 |
| Reactor Inside Diameter, inches | 22.0625 | 22.0625 | 22.0625 |
| Reactor Volume, gal | 18700 | 18700 | 18700 |
| Reactor Length, ft | 941 | 941 | 941 |
| Pressure Drop per Foot of Reactor, ft/ft | 0.066 | 0.098 | 0.098 |

(Metric Units)

| Description | 0.61 m Pump | 0.66 m Pump | 0.66 m Pump + CTO |
|---|---|---|---|
| Avg. Reactor Solids concentration, wt. % | 39 | 45 | 53 |
| Polymer Production Rate, metric tons/hr | 18.2 | 18.5 | 18.1 |
| Reactor Circulation Pump Power, kw | 430 | 691 | 753 |
| Circulation Pump Pressure Diff, N/cm² | 9.86 | 15.4 | 16.3 |
| Circulation Pump Head, m | 18.8 | 28.2 | 28.2 |
| Reactor Slurry Flow Rate, m³/min | 148 | 174 | 170 |
| Reactor Slurry Density, gm/cc | 0.534 | 0.558 | 0.592 |
| Reactor Temperature, EC | 102.0 | 103.5 | 102.7 |

TABLE 4-continued

| | | | |
|---|---|---|---|
| Ethylene Concentration, wt % | 4.43 | 3.67 | 4.9 |
| Hexene-1 Concentration, wt % | 0.22 | 0.17 | 0.14 |
| Reactor Heat Transfer Coefficient | — | — | — |
| Reactor Inside Diameter, cm | 56.04 | 56.04 | 56.04 |
| Reactor Volume, m$^3$ | 70.80 | 70.80 | 70.80 |
| Reactor Length, m | 287 | 287 | 287 |
| Pressure Drop per Meter of Reactor, m/m | 0.066 | 0.098 | 0.098 |

"CTO" means "Continuous Take Off"

TABLE 5

Length / Diameter Ratio Calculations
(English Units)

| Row | Reference | OD (in.) | ID (in.) | Length (ft) | Vol (ft$^3$) | Vol. (gal) | L/OD ratio (ft/ft) |
|---|---|---|---|---|---|---|---|
| 1 | '235 7/12–14 | 24 | 21.9 | 500 | 1308 | 9784 | 250 |
| 2 | '235 6/4 | 24 | 21.9 | 767 | 2005 | 15000 | 383 |
| 3 | '235 7/12–14 | 24 | 21.9 | 900 | 2354 | 17611 | 450 |
| 4 | '235 6/4 | 24 | 21.9 | 920 | 2406 | 18000 | 460 |
| 5 | '235 7/12–14: | 24 | 21.9 | 940 | 2459 | 18394 | 470 |
| 6 | '235 6/53 | 24 | 21.9 | 950 | 2485 | 18590 | 475 |
| 7 | '344 Ex.3 | 20 | 18.395 | 833 | 1537 | 11500 | 500 |
| 8 | '235 8/37 | 24 | 21.9 | 1022 | 2674 | 20000 | 511 |
| 9 | '235 7/12–14 | 24 | 21.9 | 1350 | 3531 | 26417 | 675 |
| 10 | '235 6/12 | 24 | 21.9 | 1533 | 4010 | 30000 | 767 |
| 11 | '344 5/37 | 20 | 18.395 | 1449 | 2674 | 20000 | 869 |

TABLE 5

Length / Diameter Ratio Calculations
(Metric Units)

| Row | Reference | OD (m.) | ID (m) | Length (m) | Vol (m$^3$) | L/OD ratio (m/m) |
|---|---|---|---|---|---|---|
| 1 | '235 7/12–14 | 0.60957 | 0.5562 | 152 | 37 | 250 |
| 2 | '235 6/4 | 0.60957 | 0.5562 | 234 | 57 | 383 |
| 3 | '235 7/12–14 | 0.60957 | 0.5562 | 274 | 67 | 450 |
| 4 | '235 6/4 | 0.60957 | 0.5562 | 280 | 68 | 460 |
| 5 | '235 7/12–14: | 0.60957 | 0.5562 | 286 | 70 | 470 |
| 6 | '235 6/53 | 0.60957 | 0.5562 | 290 | 70 | 475 |
| 7 | '344 Ex.3 | 0.50798 | 0.4672 | 254 | 44 | 500 |
| 8 | '235 8/37 | 0.60957 | 0.5562 | 312 | 76 | 511 |
| 9 | '235 7/12–14 | 0.60957 | 0.5562 | 411 | 100 | 675 |
| 10 | '235 6/12 | 0.60957 | 0.5562 | 467 | 114 | 767 |
| 11 | '344 5/37 | 0.50798 | 0.4672 | 442 | 76 | 869 |

That which is claimed is:

1. A polymerization loop reactor comprising:
a loop reaction zone configured to polymerize an olefin monomer into a polyolefin in the presence of a diluent and defined by a generally cylindrical wall having a nominal outside diameter of at least 22 inches (55 cm), wherein a length/diameter (L/D) ratio of the generally cylindrical wall is in the range of 700 to about 1500;
an impeller disposed within the loop reaction zone within a casing portion of the generally cylindrical wall, the casing portion having a first inside diameter, and the remaining portion of the cylindrical wall having at least a second inside diameter, wherein the first inside diameter is larger than the second inside diameter; and
a continuous take off (CTO) positioned along the generally cylindrical wall and configured to substantially continuously withdraw a discharge slurry having a solids concentration greater than an average solids concentration of the slurry circulating through the loop reaction zone.

2. The polymerization loop reactor of claim 1, wherein the solids concentration of the discharge slurry is greater than 50 weight percent.

3. The polymerization loop reactor of claim 1, wherein a flow path of the CTO is configured substantially tangential to a curvature of an elbow of the generally cylindrical wall.

4. The polymerization loop reactor of claim 1, wherein a diameter of the impeller is at least as large as the second inside diameter of the generally cylindrical wall.

5. The polymerization loop reactor of claim 1, wherein the casing portion of the generally cylindrical wall has a first nominal outside diameter and the remaining portion of the generally cylindrical wall has at least a second nominal outside diameter, wherein the first nominal outside diameter is larger than the second nominal outside diameter.

6. The polymerization loop reactor of claim 5, wherein the first nominal outside diameter is at least about 2 inches larger than the second nominal outside diameter.

7. The polymerization loop reactor of claim 6, wherein the impeller is sized to circulate at least about 34,000 gallons per minute (gpm) of the slurry through the loop reaction zone.

8. The polymerization loop reactor of claim 1, wherein the nominal outside diameter is about 24 inches (57 cm), about 26 inches (66 cm), about 28 inches (70 cm), or about 30 inches (76 cm).

9. The polymerization loop reactor of claim 1, wherein a size and a geometry of the impeller are configured to provide for circulation of the slurry through the loop reaction zone at a velocity greater than the saltation velocity of the slurry.

10. The polymerization loop reactor of claim 1, wherein the loop reactor zone has a volume of at least 22,000 gallons (84 m$^3$).

11. The polymerization loop reactor of claim 1, wherein the loop reactor zone has a volume of at least 40,000 gallons (152 m$^3$).

12. The polymerization loop reactor of claim 1, wherein the loop reactor zone has a volume at least 45.000 gallons (76 m$^3$).

13. The polymerization loop reactor of claim 1, wherein the loop reactor zone has a volume of greater than 30,000 gallons (114 m$^3$).

14. The polymerization loop reactor of claim 1, wherein an average solids concentration of the slurry circulating through the loop reaction zone is greater than about 50 weight percent.

15. The polymerization loop reactor of claim 1, wherein the CTO is configured to facilitate pressure control of the loop reaction zone.

16. A polymerization loop reactor comprising:
a loop sluny reactor configured to polymerize olefin into polyolefin, and comprising:
  a reaction zone having a volume of at least about 22,000 gallons and defined by a generally cylindrical wall having a nominal outside diameter of at least 22 inches (55 cm), wherein a ratio of a length of the loop reaction zone to the nominal outside diameter is in the range of 700 to about 1500;
  an in-line impeller disposed in the reaction zone, wherein a first inside diameter of a casing portion of the generally cylindrical wall surrounding the in-line impeller is larger than a second inside diameter of a remaining portion of the generally cylindrical wall, wherein the in-line impeller and associated motor are configured to circulate a polyolefin slurry through the loop reaction zone at a velocity greater than a saltation velocity of the slurry; and
  a continuous take off (CTO) configured to substantially continuously withdraw the slurry from the loop reaction zone and to facilitate pressure control of the loop reaction zone.

17. The system of claim 16, wherein a first nominal outside diameter of the casing portion is greater than a second nominal diameter of the remaining portion by at least about 2 inches.

18. A polymerization loop reactor comprising:
a loop reaction zone configured to polymerize olefin into a polyolefin, and defined by a generally cylindrical wall having a nominal outside diameter of at least 22 inches, wherein the length of the loop reaction zone and the nominal outside diameter of the generally cylindrical wall define a length/diameter ratio in the range of 700 to about 1500;
an in-line axial pump comprising an external motor, a casing, and an in-line impeller disposed within the casing, the casing having a casing nominal outside diameter at least about 2 inches larger than the nominal outside diameter of the generally cylindrical wall; and
a plurality of continuous take offs configured to continuously withdraw a fluid slurry from the loop reaction zone.

19. The polymerization loop reactor of claim 18, wherein a diameter of the impeller is at least as large as an inside diameter of the generally cylindrical wall.

20. A polyethylene production system comprising:
a loop slurry reactor comprising:
  a loop reaction zone configured to polymerize ethylene into polyethylene and defined by a generally cylindrical wall having a nominal outside diameter of at least 22 inches, wherein the length of the loop reaction zone and the nominal outside diameter of the generally cylindrical wall define a length/diameter ratio in the range of 700 to about 1500;
  an impeller configured to circulate a slurry through the loop reaction zone at a velocity greater than a saltation velocity of the slurry, wherein the slurry comprises polyethylene solid particles in a liquid diluent, and the velocity is at least 32 feet per second; and
  a continuous take off (CTO) configured to substantially continuously withdraw a discharge slurry from the loop reaction zone and to facilitate pressure control of the loop reaction zone, wherein the CTO is positioned along the generally cylindrical wall to so that the discharge slurry has a solids concentration higher than an average solids concentration of the circulating slurry; and
a flash chamber configured to receive the discharge slurry and to vaporize liquid diluent in the discharge slurry.

21. The polyethylene production system of claim 20, wherein the impeller comprises at least two impeller disposed in series in the loop reaction zone.

* * * * *